United States Patent [19]

Brambach

[11] Patent Number: 5,192,482
[45] Date of Patent: Mar. 9, 1993

[54] METHOD OF PRODUCING A LOCAL REINFORCEMENT IN A SANDWICH STRUCTURE

[75] Inventor: Johan A. Brambach, Leimuiden, Netherlands

[73] Assignee: Schreiner Luchtvaart Groep B.V., Leiden, Netherlands

[21] Appl. No.: 816,257

[22] Filed: Jan. 3, 1992

Related U.S. Application Data

[62] Division of Ser. No. 476,533, Feb. 7, 1990.

[30] Foreign Application Priority Data

Feb. 17, 1989 [NL] Netherlands ............ 8900398

[51] Int. Cl.$^5$ .................................. B29C 45/16
[52] U.S. Cl. ..................... 264/257; 264/258; 264/261
[58] Field of Search ......... 264/257, 258, 250, 255, 264/261, 273

[56] References Cited

U.S. PATENT DOCUMENTS

| | | | |
|---|---|---|---|
| 3,492,381 | 1/1970 | Rhyne | 264/27 |
| 4,376,003 | 3/1983 | Elbez et al. | 156/79 |
| 4,783,298 | 11/1988 | Oda | 264/255 |
| 4,826,723 | 5/1989 | Brambach | 428/284 |
| 4,889,763 | 12/1989 | Brambach | 428/246 |
| 4,933,131 | 6/1990 | Okey et al. | 264/261 |
| 5,043,127 | 8/1991 | Brambach | 264/257 |

FOREIGN PATENT DOCUMENTS

| | | |
|---|---|---|
| 0095287 | 11/1983 | European Pat. Off. . |
| 0212970 | 4/1987 | European Pat. Off. . |
| 0274789 | 7/1988 | European Pat. Off. . |
| 0345855 | 12/1989 | European Pat. Off. . |

OTHER PUBLICATIONS

Patent Abstracts of Japan, vol. 11, No. 200 (C-431) [2647], Jun. 27, 1987; JP-A-62 22 833 (Asahi Chem. Inc. Co., Ltd.) Jan. 31, 1987.

*Primary Examiner*—Tim Heitbrink
*Attorney, Agent, or Firm*—Burns, Doane, Swecker & Mathis

[57] ABSTRACT

The invention is directed to a sheet-like sandwich material provided with a local reinforcement having a core material sandwiched between two reinforced top layers, which core material is a thermoplastic, formed core material or a core material having a honeycomb structure, and which top layers a thermoplastic synthetic plastic material reinforced with fibers, preferably in the form of a woven fabric, a knitted fabric, a fibrous web, or unidirectionally applied fibers, and at least one local reinforcement having an amount of plastic material injected under pressure into the core material through one of the top layers, and which plastic material has hardened after injection and to a process for providing a local reinforcement in a sheet-like sandwich material.

22 Claims, No Drawings

METHOD OF PRODUCING A LOCAL REINFORCEMENT IN A SANDWICH STRUCTURE

This application is a divisional of application Ser. No. 07/476,533, filed Feb. 7, 1990.

BACKGROUND OF THE INVENTION

1. Field of the Invention

This invention relates to a sheet-like sandwich material provided with a local reinforcement and to a method of providing a local reinforcement in a sheet-like material, such as a sandwich structure. More specifically, the invention relates to a thermoplastic sandwich structure and to a method of providing a reinforcement in a thermoplastic sandwich structure.

2. Description of the Related Art

Sheet-like materials, such as sandwich structures, find wide application in areas where materials are used which must combine a high strength or rigidity with a light weight. This is the case, for example, in air, space, and transport applications.

Sandwich structures generally consist of a core material that is light in weight, with a top layer, often reinforced, on both surfaces thereof. Owing to the excellent bonding between the top layers and the core material, proper stiffness is obtained. The other properties of the material are partly determined by the nature of the various materials.

Known sandwich structures are based on a core material having a honeycomb structure. Another type of sandwich material is described in European Patent Applications Nos. 264 495 and 268 148, which are incorporated herein by reference. This material is fully thermoplastic and consists of a core material including, among other components, a thermoplastic foam, and two top layers consisting of a fibre-reinforced synthetic plastics material, such as polycarbonate or polyether imide.

In European Patent Application No. 88202345.0, which is incorporated herein by reference, a flame-retarding sheet material is described which is also thermoplastic.

European Patent Application No. 345 855, published on Dec. 13, 1989, which is incorporated herein by reference, relates to a non-foamed film which can be used for the manufacture of a thermoplastic sandwich material.

In the application of a sandwich structure, it may sometimes be desirable that local reinforcements be provided in the material. Sandwich structures are often in the form of a plate, for example, a wall panel, to which various objects must be secured. As this may locally involve rather considerable forces, it is necessary to provide local reinforcement to enable auxiliary means to be secured. In the known systems this is effected by making a hole in one of the top layers of the sandwich structure. Subsequently, core material is removed, whereafter a solid filler is substituted for the core removed. Conventional fillers are based on thermosetting two-component systems. This operation is highly labor-intensive, the result of which is that the cost of labor involved in processing sandwich structures is high, and processing takes a long time, too.

SUMMARY OF THE INVENTION

It is one object of the present invention to provide a sheet-like sandwich material provided with a local reinforcement, comprising a core material sandwiched between two reinforced top layers, which core material is a thermoplastic, foamed core material or a core material having a honeycomb structure, and which top layers consist of a thermoplastic synthetic plastics material reinforced with fibres, preferably in the form of a woven fabric, a knitted fabric, a fibrous web, or unidirectionally applied fibres, and at least one local reinforcement.

It is another object of the invention to provide a method of providing a local reinforcement in the core of a sandwich structure. The sheet-like material and the method according to the invention do not have the disadvantages inherent in the known methods of providing local reinforcements in sheet materials.

DESCRIPTION OF THE PREFERRED EMBODIMENTS

The sheet-like sandwich material to the invention accordingly comprises a core material sandwiched between two reinforced top layers and at least one local reinforcement consisting of an amount of plastic material injected under pressure into the core material through one of the top layers, and which plastic material has hardened after injection.

The method according to the invention relates to the provision of a local reinforcement in a sheet-like material comprising a core material sandwiched between two reinforced top layers, and which comprises injecting an amount of plastic material under pressure through one of the top layers into the core material, which plastic material hardens after injection.

Surprisingly it has been found that, according to the invention, a sheet-like sandwich material is provided which has good possibilities for the application of auxiliary means, such as fixtures, hinges, brackets, lamp holders, and the like, while the local reinforcement can be provided in the sandwich material rapidly, efficiently and reliably.

According to a preferred embodiment of the method according to the invention, the plastic material replaces and/or melts the core material at the place where it is injected. Preferably, the amount of the material to be injected and its temperature are adjusted in such a manner that a portion of the foam melts away at the injection site. As, during the injection, the required melting heat provides for cooling of the plastic material, a hard layer is formed on the outside of the injection, as a result of which pressure build-up is possible, so that a local reinforcement is formed.

It is noted that U.S. Pat. No. 3,492,381 discloses a method for providing a reinforcement in chipboard or other porous material by injecting a bonding agent, such as a urea-based bonding agent. According to this method, the core material is pressed away, so that there is the risk that the sheet material is damaged. Surprisingly it has been found that this risk does not exist in the application of the present invention, for one thing owing to the effect described above with regard to the hardening of the outside of the material injected.

A preferred plastic material is a thermoplastic synthetic resin or mixture of thermoplastic synthetic resins with a softening temperature of at least 50° C. Such plastics may, inter alia, be selected from the group consisting of polystyrene, styrene polymers, acrylate and/or methacrylate polymers, polyolefins, polyesters, such as PET and PBT, polycarbonate, polyether imide, polyamide, polysulphone, polyether sulphone, polyether ketone, polyether ether ketone, polyether ketone ketone, polyphenylene oxide, polyphenylene sulphide, and mixtures of two or more of these synthetic plastics materials. Such materials not only have the advantage of being capable of being injected into the core with facility, but contribute towards improving the pressure resistance of the sheet material.

If so desired, these synthetic plastics materials may contain a quantity of fibers, which are injected along with it. The fibers are preferably selected from the group consisting of glass fibers, polyamide fibers, such as aramide fibers, polyethylene fibers, polyester fibers and carbon fibers.

It is also possible to incorporate a quantity of blowing agent into the synthetic plastics material to be injected, which blowing agent forms a foam of the synthetic plastics material injected during and after the injection. Naturally, it is then of importance that the quantity of foaming agent should be such that the density of the reinforcement is greater than the density of the surrounding core material, or that the pressure resistance of the foam formed should be greater than the pressure resistance of the core of the sheet-like sandwich material.

It is noted that it also possible to inject two plastic materials simultaneously, or one after the other. In this connection one may in particular be thinking of such an injection of two different materials that one material forms the core of the injection and the other material forms a kind of skin around it. This can be achieved both by the simultaneous injection of two or more materials, and by the consecutive injection of such two or more materials.

The sheet-like material (sandwich structure) to be reinforced preferably consists of a thermoplastic, foamed core material and two top layers consisting of a thermoplastic synthetic resin reinforced with a woven fabric, a knitted fabric, a fibrous web, or unidirectionally applied fibers. Such a material is described, for example, in European Patent Applications Nos. 264 495 and 268 148, referred to hereinbefore.

The sheet material (sandwich structure) to be reinforced can be made by laminating the components to be used, foam core and top layers, possibly with bonding layers between them, and with or without the use of softening agents, and subsequently bonding the layers together by applying heat and pressure. It is also possible for the foamed core material to be generated in situ by using an expandable material which foams and bonds to the top layers when heated. One example of such an expandable material is described in European Patent Application No. 345 855, which is incorporated herein by reference. This material can be used for both the core material and an additional bonding layer.

The materials from which the sheet-like material may be made are also described in the European patent applications referred to. More specifically, the thermoplastic foamed core material is a polyether imide foam, a polycarbonate foam, a polymethacrylamide foam, a polyester foam, such as a foam of PET or PBT, a polyether sulphone foam, a polyether ketone foam, a polyether ether ketone foam, a polyether ketone ketone foam, a polyphenylene oxide foam, a polyphenylene sulphide foam, or foam materials made of mixtures of thermoplastic synthetic resins containing at least one of the thermoplastic synthetic resins referred to. It is also possible to use a combination of two or more foams for the core material.

If desired, fibers may be incorporated in the foam material. Such fibers may be selected from the group consisting of glass fibers, polyamide fibers, such as aramide fibers, polyethylene fibers, polyester fibers, carbon fibers, and combinations of two or more of these fibers.

Also, to improve the mechanical properties of the material, it may be preferable to incorporate liquid crystalline materials in the foam. Specifically if the foam is generated in situ during the manufacture of the sandwich material, the use of such materials has been found to give good results.

When the above foam materials are used, in combination with the thermoplastic synthetic resins, to be specified hereinafter for the top layer and the reinforcement, an optimum construction of the reinforcement and a maximum strength of the total construction and of the reinforced points are obtained.

The top layers consist of fiber-reinforced synthetic plastics, more particularly of a thermoplastic synthetic resin reinforced with a woven fabric, a knitted fabric, a fibrous web, or unidirectionally applied fibers.

The thermoplastic synthetic resin, the matrix material of the top layers, is generally a synthetic plastics or a mixture of synthetic plastics having a high softening point, for example polyester, such as PET and PBT, polycarbonate, polyether imide, polyamide, polysulphone, polyether sulphone, polyether ketone, polyether ether ketone, polyether ketone ketone, polyphenylene oxide, polyphenylene sulphide, or a mixture of two or more of these plastics. It is also possible to use two or more different top layers or materials for the top layers.

In the top layer, these synthetic plastics are preferably reinforced with glass fibers, polyamide fibers, such as aramide fibers, polyethylene fibers, polyester fibers, and carbon fibers. The nature of the fiber reinforcement in the top layer has no substantial effect on the conditions for the injection of the thermoplastic synthetic resin into the core, but the degree of reinforcement may have an effect on it. In fact, according as the density of the fiber reinforcement in the skin is higher, the more pressure will have to be exercised for injection through the top layer. However, these pressure variations always range within conventional injection molding pressures. In the case of very high densities of the fibers in the skin it may in certain cases be desirable or advantageous to drill a small hole into the skin. This, however, is not comparable at all to drilling a large hole and removing the core as has hitherto been conventional.

The method according to the invention is quite simple to perform, and it is possible to use existing equipment. In fact, when an injection molding machine is used, one only has to move the nozzle (die piece) thereof to the place to be reinforced and to inject a metered dose of molten thermoplastic synthetic resin. Owing to the force of the injection, the plastic material is injected through the top layer and finds its way into the core. Depending on the conditions and materials used, this will take place through displacement and/or fusion. Especially when used in thermoplastic sandwich structures, this has great advantages, as the heat of the molten thermoplastic synthetic resin being injected causes the foam to melt during its injection into the core of the sandwich structure. It has been found that, in this manner, there is also obtained a good bonding of the local reinforcement in the core to the top layers. It can also be accomplished, through a proper choice of materials, that good bonding is obtained between the reinforcement and the rest of the core material. In known methods of reinforcing sandwich structures, bonding to the top layers, in particular, may leave much to be desired.

According to a different embodiment of the method according to the invention, the plastic material is directly injected into the core, which is also attended by displacement and/or fusion.

For carrying out the method according to the invention, conventional injection molding machines can be used. To the extent necessary, adaptation may be desirable for the nozzle (die piece) to be taken to the proper place for injection. It is also possible, however, to use modified equipment, for example, injection molding machines enabling injection of the plastic material direct into the core material. For this purpose, for example, equipment may be used provided with a kind of "needle-shaped" injection nozzle, which is inserted through the top layer into the core. It is also possible to use nozzles having more than one aperture, so that more than plastic material may be used.

When relatively high injection pressures are used, it may be desirable for the sheet-like material to be supported at the back, i.e. the side where no injection takes place, to prevent the plastic material from being forced through the sheet.

The thermoplastic synthetic resin is dosed, depending on the nature of the material, the desired reinforcement in the core, and the thickness of the sandwich construction. It has been found, however, that the quantity is not very critical. For a sandwich structure 8 mm thick, a dosage of 0.5-20 ml plastic material can be used. A good local reinforcement is then obtained.

The invention is also applicable to other sandwich structures than those described in the above European patent applications. In particular, the invention is also suitable for providing local reinforcement in sandwich structures based on a core material having a honeycomb structure.

The method according to the invention is applicable to flat sheet-like materials, but also to sheet-like articles already formed. An important point in this connection is that, in principle, the reinforcement does not affect the further processability and deformability of the sheet material. This is of great importance for the thermoplastic sandwich structures of the above European patent applications, whose major advantage is in fact that they continue to be thermoplastically deformable. The methods of manufacture and processing described in the European patent applications referred to in the introductory part of this specification can be applied without any problems to the materials according to the present invention, both before and after the provision of the local reinforcement.

The locally reinforced sheet materials can be provided with auxiliary means at the position of the reinforcement. Examples of such means that are threaded bushings, hinges, pivots, and the like. When threaded bushings or comparable auxiliary means are mounted, it may have advantages for them to be installed together with the reinforcement during injection.

A major advantage of the invention is that the pressure resistance of the material according to the invention is greatly improved. This makes it possible for auxiliary means to be provided on its surface by means of injection molding. With conventional materials this was impossible, because the pressure resistance of the sheet material was insufficient for the purpose.

Alternatively, auxiliary means can be provided prior to, or after, the provision of the local reinforcement. Accordingly, there is the possibility for such auxiliary means to be provided by injection molding. It is possible to do this in one operation, together with the provision of the reinforcement. It is also possible, however, for these auxiliary means to be provided in one or more supplementary operations. One suitable method is providing such an auxiliary means, such as a fixing aid, a part, or a product, at the already reinforced place by injection molding. Naturally, it is also possible to do this by using conventional attachment techniques, such as screwing, cementing, and the like.

The invention is illustrated in and by the following example, but is not so limited.

EXAMPLE

A sandwich panel consisting of a foam core of polyether imide with a specific gravity of 90 km/m$^3$ and two top layers of glass fibre web (107 g/m$^2$), impregnated with polyether imide (50%), and 5 mm thick, was provided with a reinforcement. This was effected by injecting molten polyether imide by means of an injection molding nozzle (die piece) through the top layer. The sandwich panel was supported with a metal plate on one side, while the nozzle was held in contact with the surface of the top layer on the other side. The nozzle was provided with an area extension. Owing to the force of the injection, the material was injected into the core with an injection period of 2 seconds. The resulting, reinforced surface had a diameter of 30 mm. The compressive strength at the reinforcement was 120 N/mm$^2$. The compressive strength of the panel itself was 3 N/mm$^2$.

I claim:

1. A method for providing a local reinforcement in a sheet material comprising a core material sandwiched between two reinforced top layers, said core material being one of a thermoplastic, foamed core material and a core material having a honeycomb structure, and wherein said top layers comprise a thermoplastic synthetic plastic material reinforced with fibers, the process comprising the steps of injecting an amount of plastic material under pressure through one of the top layers into the core material, and allowing the plastic material to harden after injection.

2. A method as claimed in claim 1, wherein said fiber reinforcement comprises a woven fabric, a knitted fabric, a fibrous web, or unidirectionally applied fibers.

3. A method according to claim 1, wherein the plastic material replaces the core material at the place where it is injected.

4. A method according to claim 1, wherein the plastic material melts the core material at the place where it is injected.

5. A method according to claim 1, wherein the plastic material replaces and melts the core material at the place where it is injected.

6. A method as claimed in claim 1, wherein the plastic material is a thermoplastic synthetic resin with a softening temperature of at least 50° C.

7. A method as claimed in claim 1, wherein the plastic material is injected under pressure through the reinforced top layer into the core by means of an injection molding machine.

8. A method as claimed in claim 1, wherein said thermoplastic foamed core material is polycarbonate foam, polymethacrylamide foam, polyester foam, polyether sulfone foam, polyether ketone foam, polyether ether ketone foam, polyether ketone ketone foam, polyphenylene oxide foam, or polyphenylene sulphide foam.

9. A method as claimed in claim 8, wherein said polyester foam is polyethylene terephthalate or polybutylene terephthalate.

10. A method as claimed in claim 1, wherein the thermoplastic, foamed core material contains fibers.

11. A material as claimed in claim 10, wherein the fibers are selected from the group consisting of glass fibers, polyamide fibers, polyethylene fibers, polyester fibers, and carbon fibers.

12. A method as claimed in claim 1, wherein the thermoplastic, foamed core material contains liquid crystalline materials.

13. A method as claimed in claim 1, wherein the thermoplastic synthetic resin of the top layer is selected from the group consisting of polyester, polycarbonate, polyether imide, polyamide, polysulfone, polyether sulfone, polyether ketone, polyether ether ketone, polyether ketone ketone, polyphenylene oxide, polyphenylene sulphide, and mixtures thereof.

14. A method as claimed in claim 1, wherein the material of the reinforcement in the top layer is selected from the group consisting of glass fibers, polyamide fibers, polyethylene fibers, polyester fibers, and carbon fibers.

15. A method as claimed in claim 6, in which the thermoplastic synthetic resin to be injected is selected from the group consisting of polystyrene, styrene polymers, (meth)acrylate polymers, polyolefins, polyesters, polycarbonate, polyether imide, polyamide, polysulfone, polyether sulfone, polyether ketone, polyether ether ketone, polyether ketone ketone, polyphenylene oxide, polyphenylene sulphide, and mixtures thereof.

16. A method as claimed in claim 6, wherein the synthetic plastics material to be injected contains fibers.

17. A method as claimed in claim 16, wherein the fibers are selected from the group consisting of glass fibers, polyamide fibers, polyethylene fibers, polyester fibers and carbon fibers.

18. A method as claimed in claim 1, including the step of mounting an auxiliary device in the local reinforcement.

19. A method as claimed in claim 18, wherein the auxiliary device is mounted during the injection of the plastic material.

20. A method as claimed in claim 18, wherein the auxiliary device is mounted in the local reinforcement after the plastic has been injected.

21. A method as claimed in claim 18, wherein the auxiliary device is mounted in place by way of additional injection molding.

22. A method as claimed in claim 18, wherein the auxiliary device is one of a fastener, bushing, hinge and pivot.

* * * * *